United States Patent [19]
Lore et al.

[11] 4,102,471
[45] Jul. 25, 1978

[54] SWITCH GUARD ASSEMBLY

[76] Inventors: Nicola Lore, 35 Burkhardt Ave., Bethpage, N.Y. 11714; Charles Di Pietro, 15 Doherty Ave., Elmont, N.Y. 11003

[21] Appl. No.: 831,611

[22] Filed: Sep. 8, 1977

[51] Int. Cl.² .............................................. H02G 3/14
[52] U.S. Cl. ................................... 220/242; 220/336; 220/3.8; 174/67; 200/334
[58] Field of Search ............... 220/241, 242, 3.8, 336; 200/334; 174/66, 67; 339/36, 37

[56] References Cited
U.S. PATENT DOCUMENTS

| | | | |
|---|---|---|---|
| 2,880,264 | 3/1959 | Ruskin | 174/67 |
| 3,188,379 | 6/1965 | Simon | 174/67 X |
| 3,204,807 | 9/1965 | Ramsing | 220/242 |
| 3,491,327 | 1/1970 | Tait et al. | 339/36 |
| 3,966,073 | 6/1976 | Geisel | 220/242 X |

*Primary Examiner*—George T. Hall
*Attorney, Agent, or Firm*—Herbert L. Lerner

[57] ABSTRACT

A switch guard assembly for preventing accidental actuation of a switch, the assembly including a switch plate and a box-shaped member mounted on the switch plate and having a front wall formed with a surface disposed substantially parallel to the switch plate, and the front wall being closed against access by the fingers of an operator's hand through the front wall to a switch actuator extending out of the switch plate, the box-shaped member having at least one fully open side for affording access to the switch actuator by the fingers of an operator's hand.

12 Claims, 5 Drawing Figures

SWITCH GUARD ASSEMBLY

The invention relates to a switch guard assembly mountable on a switch plate for preventing accidental actuation of a wall or machine-mounted switch.

Most switches in general use today are secured in an outlet box in a wall or in a machine. In the front surface of the switch are threaded holes which receive screws that fasten a switch plate to the switch. The screws are inserted through holes in the switch plate which are located in standard positions. A cutout is provided in the switch plate through which a toggle or snap switch protrudes.

A problem arises with swtiches which control lights in areas where the lights must be kept on, or off, for periods of time, or which control oil burners, dangerous machinery, burglar or fire alarms, clocks, dark rooms, X-ray or operating rooms in hospitals, exit lights, and in other such areas, in which the protruding toggle switch can be accidentally moved. This is a continuous problem in homes, offices and factories where a switch can be accidentally activated by objects or people passing by or by children. A further problem is that of clothing or other items getting stuck on a switch or moving objects damaging a switch.

Conventional devices seeking to solve these problems have either failed to adequately guard the switch or are so complicated and cumbersome as to make installation and removal too difficult to be practical. The known devices have generally failed to prevent accidental access from the front of the switch, and have moreover not permitted direct unobstructed access from a lateral direction.

It is therefore an object of the invention of the instant application to overcome the above-mentioned problems and shortcomings of the heretofore known devices of this general type and to provide a switch guard assembly which is easily installable on existing on-off switch plates, dimmer switch plates and socket plates etc. of different types or which can be permanently installed on plates, as a unit.

With the foregoing and other objects in view, there is provided in accordance with the invention, a switch plate assembly for preventing accidental actuation of a switch, the assembly including a switch plate and a box-shaped member mounted on the switch plate and having a front wall formed with a surface disposed substantially parallel to the switch plate, and the front wall being closed against access by the fingers of an operator's hand through the front wall to a switch actuator extending out of the switch plate, the box-shaped member having at least one fully open side for affording access to the switch actuator by the fingers of an operator's hand.

A particularly advantageous construction of the invention allows the entire switch guard assembly to swing out of the way when actuation is desired. In accordance with another feature of the invention, there is provided a flange extending outwardly from each of two mutually opposite side walls of the box-shaped member adjacent to the switch plate, and means disposed on one flange for pivoting the box-shaped member about the switch plate.

A spring may be provided on the screw to force the guard back into position, and in accordance with a further feature of the invention, there are provided means disposed on the switch plate for stopping the pivoting of the box-shaped member.

In accordance with another feature of the invention, it is provided that the pivoting means comprise a fastening member extending from the flange to the switch plate.

In accordance with an additional feature of the invention, when the switch guard is not to be pivotally mounted, there are provided, in accordance with an additional feature of the invention, a flange extending outwardly from each of two mutually opposite side walls of the box-shaped member adjacent to the switch plate, and means disposed on each flange for fastening the box-shaped member to the switch plate.

In accordance with a further feature of the invention, it is provided that the fastening means are a member extending from each of the flanges to the switch plate.

Another advantageous embodiment of the invention allows installation of the switch guard without fastening it through holes in the switch plate, but rather at the outer edges of the switch plate. In accordance with yet another feature of the invention, there is provided a flange adjacent to the switch plate extending inwardly from each of two mutually opposite side walls of the box-shaped member, the flanges being insertable behind mutually opposite edges of the switch plate.

A special switch plate can also be constructed to provide a tighter fit for the switch guard. In accordance with yet a further feature of the invention, it is provided that the two mutually opposite edges of the switch plate each have a recess formed therein for receiving the flanges.

In order to facilitate fastening the switch guard and switch plate to the wall and in accordance with yet an additional feature of the invention, it is provided that the front wall is formed with at least one hole to permit access therethrough by part of a screwdriver to the screw mounting the switch plate to the switch.

Another advantageous embodiment of the invention provides a construction for grasping the plate at the edges of the opening formed therein to accommodate the switch actuator or socket. In accordance with still another feature of the invention, there is provided a flange adjacent to the switch plate and extending inwardly from each of two mutually opposite side walls of the box-shaped member, the box-shaped member being formed of resilient material, and L-shaped clips, respectively, extending downwardly from the inner edge of each flange and away from one another and being releasably received behind the switch plate.

When the switch guard is provided with its own special plate, the clips do not necessarily have to be inserted in the standard cutout. In accordance with a concomitant feature of the invention, it is provided that the switch plate is formed with slots wherein the clips are received.

In accordance with another feature of the invention, there is provided a switch guard assembly for preventing accidental actuation of a switch, comprising a switch plate having a front surface, a box-shaped member having one open side engageable with the front surface of the switch plate, resilient tab means extending from at least two opposite sides of the box-shaped member in direction toward the open side thereof and yieldingly engageable in corresponding slots formed in the switch plate.

Other features which are considered as characteristic for the invention are set forth in the appended claims.

Although the invention is illustrated and described herein as embodied in a switch guard assembly, it is nevertheless not intended to be limited to the details shown, since various modifications and structural changes may be made therein without departing from the spirit of the invention and within the scope and range of equivalents of the claims, such as for use with electrical sockets, dimmer switches and slide switches, and many wall-mounted electrical devices.

The construction and method of operation of the invention, however, together with additional objects and advantages thereof will be best understood from the following description of specific embodiments when read in connection with the accompanying drawings, in which.

Figure 1:
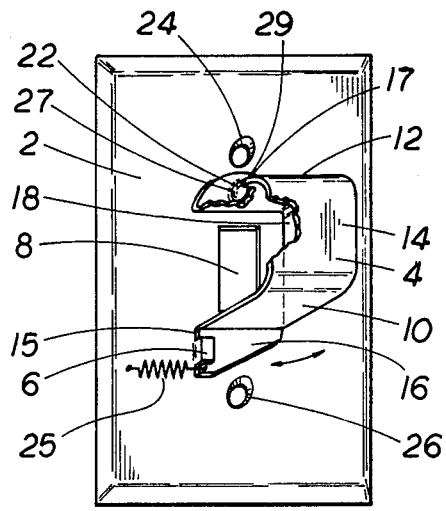
FIG. 1 is a perspective view of one embodiment of the switch guard assembly of the invention, pivotally mounted on a switch plate.

Referring now to the figures of the drawing and first, particularly to FIG. 1 thereof, there is shown a switch guard assembly with a box shaped member 4, which can be manufactured from any rigid or semi-rigid material such as sheet metal or plastic.

The box-shaped member is constructed with two side walls 10, 12 extending substantially perpendicularly to the plane of the surface of a switch plate 2. Between the two side walls 10, 12 is a front wall 14 which is substantially parallel to the surface of the switch plate 2. At the ends of the side walls 10, 12 farthest from the front wall 14 are flanges 16, 17 which extend at right angles from the side walls 10, 12 and away from each other. In one flange 17, there is formed a hole 22, which is concentric with a mounting hole 29 formed in the switch plate 2 and shown in dotted lines. The holes 24, 26 are used to secure the switch plate to the front of a switch and are located at standard locations on the switch plate 2.

The box-shaped member 4 is symmetric and is therefore centered over the cutout 8 formed in the center of the switch plate 2, when in the covered position as shown in FIG. 1. A standard toggle switch actuator (not shown) extends through the cutout. The height of the side walls 10, 12 is specifically constructed to leave a minimum clearance between the front wall 14 and the toggle switch actuator.

A screw or rivet 27 is fastened through the holes 22, 29 thereby holding the switch guard 4 in position of the switch plate 2. The screw or rivet 27 may be loosely fastened to the switch plate 2 or may be a screw which has an area below the head which has no threads and therefore can be tightened securely and yet not bind the switch guard 4. This type of fastening is used to allow pivoting motion of the switch guard 4 in the direction of the arrow about the screw 27 which acts as a pivot point. When the switch guard is fastened so as to pivot, a stop or dimple 6 is provided to hold the leading edge 15 of the flange 16 in the position shown in FIG. 1. The stop or dimple 6 may be a separate element soldered or otherwise fastened in position or may be formed from a portion of the switch plate 2, cut out on three sides and bent in the shape of a stop. The screw or rivet 27 may be additionally equipped with a suitable compression spring which forces the switch guard 4 against the stop 6. When the switch guard is pivotally mounted, ordinary mounting screws are used to mount the switch plate 2 to the switch. These mounting screws pass through the holes 26, 24 in the switch plate which are located beyond the flanges 16, 17 so as not to interfere with mounting the switch plate. A third side wall 18 extends between the side walls 10, 12 and the front wall 14. This provides access to the switch by swinging away the box-shaped member, while preventing accidental actuation of the switch. To return the box-shaped member 4 to the stop 6, a tension spring 25 may be secured at one end to the flange 16 and at the other end to a location on the switch plate 2 beyond the open end of the stop 6. When the spring 25 is used, the above-mentioned compression spring on the screw 27 is not used.

Figure 4:
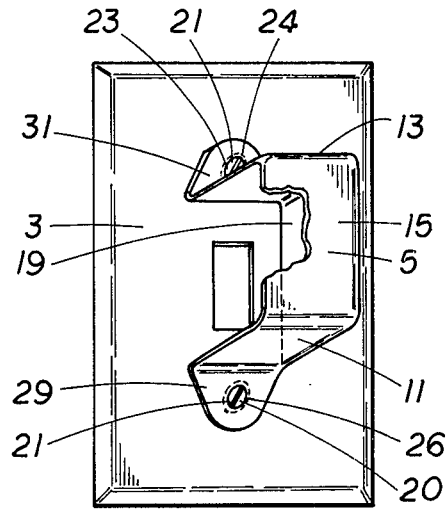
FIG. 4 is a perspective view of a fouth embodiment of the invention, mounted through the screw holes on a conventional switch plate.

In the embodiment of FIG. 4 there is shown a box-shaped member 5 secured to a conventional switch plate 3. The box-shaped member 5 is formed of side walls 11, 13 extending perpendicularly to the switch plate 3 and a front wall 15 from one side wall to the other. Flanges 29, 31 are located at the edges of the side walls 11, 13, respectively, extending parallel to the switch plate 3 and away from each other. The flanges 29, 31 have holes 20, 23, respectively, formed therein.

The box-shaped member 5, can also be permanently fastened in fixed position to a switch plate through the holes 20, 23 formed in the flanges 29, 31. The switch guard 5 is permanently attached to the switch plate 3, by screws 21 which pass through the holes 24, 26 formed in the switch plate, and into threaded holes in the switch. In this way, the mounting of the switch guard is accomplished simultaneously with the mounting of the switch plate. This forms one complete switch guard-switch plate unit which is mountable in a conventional manner to a switch.

The box-shaped member is also equipped with an additional side wall 19 extending between the side walls 11, 13 and the front wall 15, thereby completely closing in one open side of the switch plate and leaving only one fully open side for access to the toggle switch. This one open side is just large enough to permit actuation of the switch actuator by the fingers of a hand, while preventing accidental actuation. The side wall 19 can be dispensed with if it is desired to have two fully open sides for access to the switch actuator.

Figure 2:
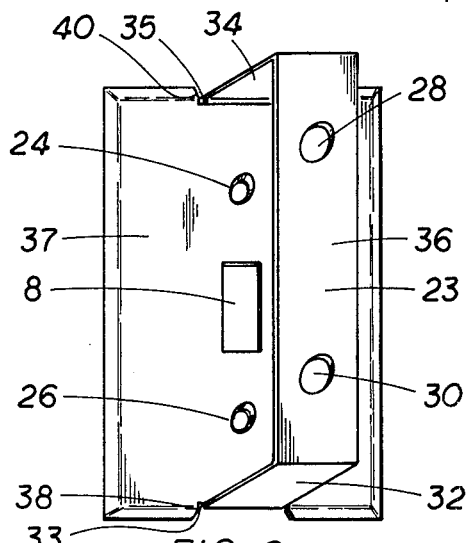
FIG. 2 is a perspective view of a second embodiment of the invention, mounted on a specially constructed switch plate.

In the embodiment of FIG. 2 there is shown a box-shaped member 23 having side walls 32, 34 extending away from a switch plate 37 and inclined towards each other so as to form acute angles with the surface of the switch plate 37. Between the two side walls 32, 34 is a front wall 36, which is substantially parallel to the surface of the switch plate 37.

The box-shaped member 23 has flanges 33, 35 which extend towards each other from the ends of the side walls 32, 34, respectively, in a direction parallel to the surface of the switch plate 37.

In the switch plate 37 are recesses 38, 40 formed in the center of the short sides of the switch plate 37. The recesses 38, 40 are slightly longer than the length of the flanges 33, 35.

The box-shaped member 23 of FIG. 2 may be formed of any resilient material such as plastic or sheet metal and is installed in place by spreading apart the side walls 32, 34 so as to increase the distance between the flanges 33, 35 until it is greater than the distance between the recesses 38, 40.

The box-shaped member 23 is then slipped over the switch plate 37. When the switch guard 23 is released, the corner between the flanges 33, 35 and the side walls 32, 34 grips the switch plate at the recesses 38, 40, and the switch guard 23 is in position as shown in FIG. 2.

The same box-shaped member 23 may be installed over a switch plate which has no recesses by spreading the walls slightly farther apart.

In the front wall 36 of the box-shaped member 23, there are formed two holes 38, 30 which are concentric with the standardly placed holes 24, 26 in the switch plate 37. The holes 28, 30 in the front wall have a diameter barely large enough to accommodate a small screw driver suitable for tightening the screws passing through the holes 24, 26 in the switch plate which are used to secure the switch plate to the switch. However, these holes are too small to permit access by the fingers of a hand. When the screws in the holes 24, 26 in the switch plate are tightened, the flanges 33, 35 are secured between the switch plate 37 and the wall.

Several box-shaped members 23 may be located on a switch plate which accommodates several switches, each box-shaped member being disposed similarly to that shown in FIG. 2, complete with holes 28, 30 formed in the front wall 36. Alternatively, switch guards 23 can be disposed across the width of a switch plate, rotated through an angle of 90° to that shown in FIG. 2. When the box-shaped member 23 is installed across a switch plate, the holes 28, 30 in the front wall 36 are not necessary since access can easily be had to the screws which fasten the switch plate to the switch.

Figure 3:
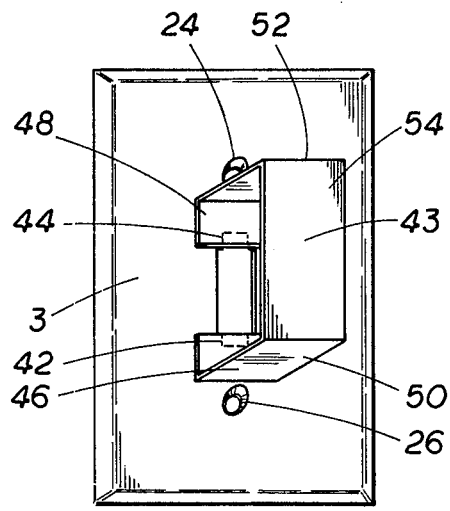
FIG. 3 is a perspective view of a third embodiment of the invention, mounted on a conventional switch plate.

The distance between the front wall 36 and the switch plate 21 is specifically calculated to be just large enough to allow movement of the switch actuator which extends through the cutout 8, similarly to the device of the first embodiment. This provides limited access to the switch actuator through one of two open sides of the box-shaped member, thereby prohibiting accidental actuation of the switch. The box-shaped member of FIG. 3, generally designated 43, is manufactured of resilient material as is the box-shaped member 23 of FIG. 2.

The box-shaped member 43 of the third embodiment of the invention has side walls 50, 52 which are inclined toward each other and connected by a front wall 54, similar to the construction of the walls in the second embodiment.

At the lower edge of the side walls 50, 52 are flanges 46, 48 which extend toward each other, parallel to the surface of the switch plate, as do the flanges 33, 35 in the second embodiment. At the center of the open edge of the flanges 46, 48 are L-shaped clips 42, 44 which extend downwardly away from the front wall 54 and then turn and face away from each other.

The device of the third embodiment is installed in place on a switch plate by squeezing the side walls 50, 52 toward each other, inserting the clips 42, 44 into the cutout 8 formed in the switch plate, and releasing the side walls 50, 52 to allow the clips 42, 44 to grip the ends of the cutout 8 through the resiliency of the switch guard. The switch plate 2 is then sandwiched between the clips 42, 44 and the flanges 46, 48.

The clips 42, 44 are only as large as is necessary to hold the switch plate. However, switches vary in size and some switch actuators fill up the entire cutout 8 and therefore the cutout must be lengthened enough to allow insertion of the clips.

Additional side walls may be added with cutout corners like those described hereinafter with respect to FIG. 5. The device of the invention may therefore have one or two open sides, and prevents accidental actuation of the switch. As will be seen hereinafter, the invention also contemplates a switch guard that has no open sides. The third embodiment has a height allowing slight clearance for a switch actuator, as is true for the first two embodiments of the invention.

The device of the third embodiment may also be rotated through 90° to permit installation on the long edge of the cutout 8.

Figure 5:
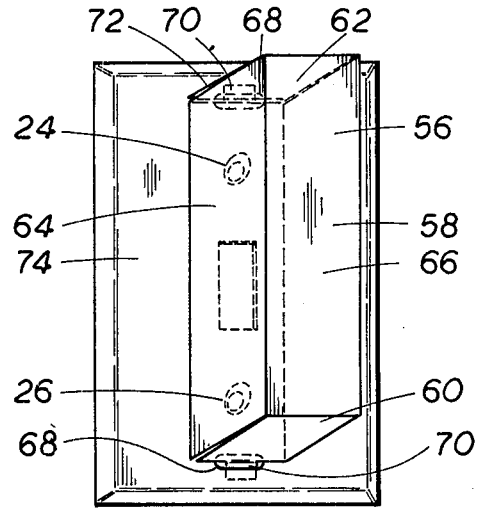
FIG. 5 is a perspective view of a fifth embodiment of the invention, completely enclosing the switch actuator.

The embodiment of FIG. 5 has a box-shaped member 56 which is constructed with two end walls 60, 62, two side walls 64, 66 and a front wall 58, thereby completely closing in the switch actuator and the holes 24, 26 used for mounting the switch plate 74 to the switch. L-shaped tabs 70 extend from the center of the bottom edge of each end wall 60, 62. These tabs 70 fit into slots 68 formed in the switch plate 74 beyond the holes 24, 26. The tabs 70 hold the box-shaped member 56 securely to the switch plate 74 when in the inserted position as shown in FIG. 5.

In order to permit removal of the box-shaped member 56, slits 72 are cut in each of the four corners between the side walls 64, 66 and the end walls 60, 62. In order to remove the box-shaped member 56, the end walls 60, 62 are squeezed together and the clips 70 are disengaged from the slots 68.

The box-shaped member can also be made of any resilient material such as plastic, thereby making the slits 72 unnecessary. The tabs 70 can also be placed on the side walls 64, 66.

There are claimed:

1. A switch guard assembly for preventing accidental actuation of a switch, the assembly including a switch plate and comprising a box-shaped member mounted on the switch plate and having a front wall formed with a surface disposed substantially parallel to the switch plate, said front wall being closed against access by the fingers of an operator's hand through the front wall to a switch actuator extending out of the switch plate, said box-shaped member having at least one fully open side for affording access to the switch actuator by the fingers of an operator's hand.

2. A switch guard assembly according to claim 1, including a flange extending outwardly from each of two mutually opposite side walls of said box-shaped member adjacent to the switch plate, and means disposed on one of the flanges for pivoting the box-shaped member about the switch plate.

3. A switch guard assembly according to claim 2, including means disposed on the switch plate for stopping the pivoting of said box-shaped member.

4. A switch guard assembly according to claim 2, wherein said means for pivoting is a fastening member extending from said flange to the switch plate.

5. A switch guard assembly according to claim 1, including a flange extending outwardly from each of two mutually opposite side walls of said box-shaped member adjacent to the switch plate, and means disposed on each flange for fastening said box-shaped member to the switch plate.

6. A switch guard assembly according to claim 5, wherein said means for fastening are members extending from each of said flanges to the switch plate.

7. A switch guard assembly according to claim 1, including a flange adjacent to the switch plate extending inwardly from each of two mutually opposite side walls of said box-shaped member, said flanges being insertable behind mutually opposite edges of the switch plate.

8. A switch guard assembly according to claim 7, wherein said two mutually opposite edges of the switch plate each have a recess formed therein for receiving the flanges.

9. A switch guard assembly according to claim 8, wherein said front wall is formed with at least one hole to permit access therethrough by part of a screwdriver to the screw mounting the switch plate to the switch.

10. A switch assembly according to claim 1, including a flange adjacent to the switch plate and extending inwardly from each of two mutually opposite side walls of said box-shaped member, said box-shaped member being formed of resilient material, and L-shaped clips, respectively, extending downwardly from the inner edge of each flange and away from one another and being releasably received behind said switch plate.

11. A switch guard assembly according to claim 10, wherein the switch plate is formed with slots wherein said clips are received.

12. A switch guard assembly for preventing accidental actuation of a switch, comprising a switch plate having a front surface, a box-shaped member having one open side engageable with the front surface of the switch plate, resilient tab means extending from at least two opposite sides of the box-shaped member in direction toward said open side thereof and yieldingly engageable in corresponding slots formed in said switch plate.

* * * * *